United States Patent [19]
Hermansson

[11] Patent Number: 5,802,958
[45] Date of Patent: Sep. 8, 1998

[54] COOKING GRILL

[76] Inventor: Alf E. Hermansson, 1330 Stanbury Road, Oakville, Ontario, L6L 2J4, Canada

[21] Appl. No.: 876,496

[22] Filed: Jun. 16, 1997

[51] Int. Cl.[6] .............................. A47J 37/00; A47J 37/06; A47J 37/08
[52] U.S. Cl. .................. 99/349; 99/372; 99/379
[58] Field of Search ..................... 99/349–351, 326–335, 99/372–379, 389–391; 219/521, 537, 585, 492, 494; 100/93 P

[56] References Cited

U.S. PATENT DOCUMENTS

| | | | |
|---|---|---|---|
| 880,498 | 3/1908 | Bates | 99/377 |
| 1,722,127 | 7/1929 | Burke | 99/379 |
| 2,009,791 | 7/1935 | Shroyer | 99/377 |
| 2,632,379 | 3/1953 | Kudo | 99/375 |
| 2,719,903 | 10/1955 | Oertli | 219/521 X |
| 3,312,161 | 4/1967 | Nanna | 99/377 |
| 3,776,124 | 12/1973 | Morley | 99/373 X |
| 4,483,239 | 11/1984 | Mueller et al. | 99/349 |
| 4,484,516 | 11/1984 | Bimman | 99/349 |
| 4,690,044 | 9/1987 | Verkler | 99/372 X |
| 4,976,194 | 12/1990 | Kelterborn et al. | 219/492 X |
| 5,095,814 | 3/1992 | Ott et al. | 99/391 |
| 5,193,439 | 3/1993 | Finesman et al. | 99/385 |

*Primary Examiner*—Timothy F. Simone

[57] ABSTRACT

A cooking grill having upper and lower cooking plates supported between first and second supports is disclosed. The upper and lower cooking plates are each hingedly connected to the supports at a rear hinge axis. The upper cooking plate may be manually tipped to a raised position. The lower cooking plate is automatically tipped downwardly to a food ejection position by means of an actuator. An ejector is provided for positively ejecting the cooked food at the end of the cooking cycle, onto a support or receiving tray, from which cooked food may be removed by hand.

21 Claims, 4 Drawing Sheets

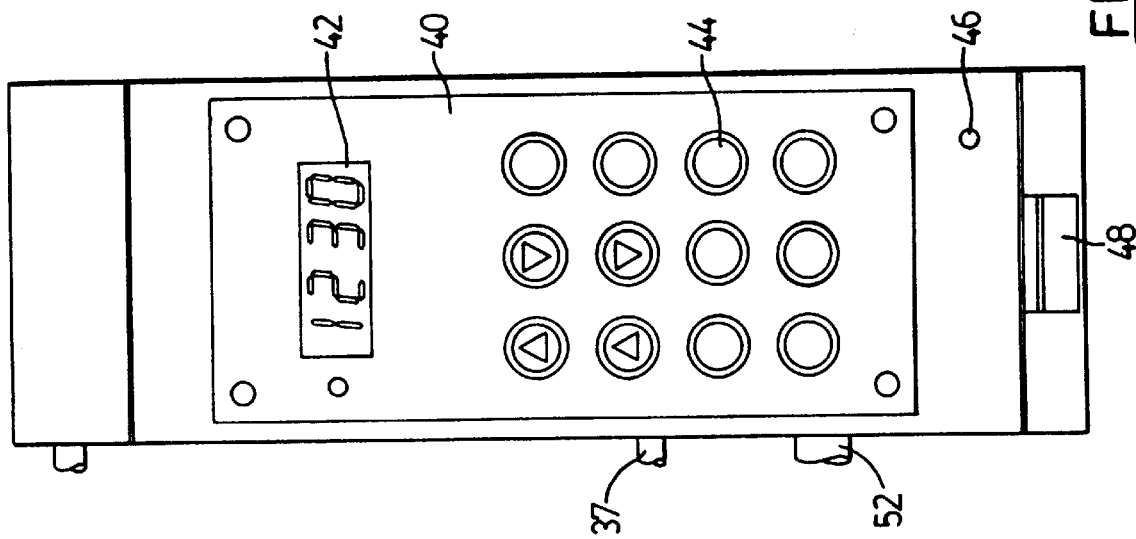
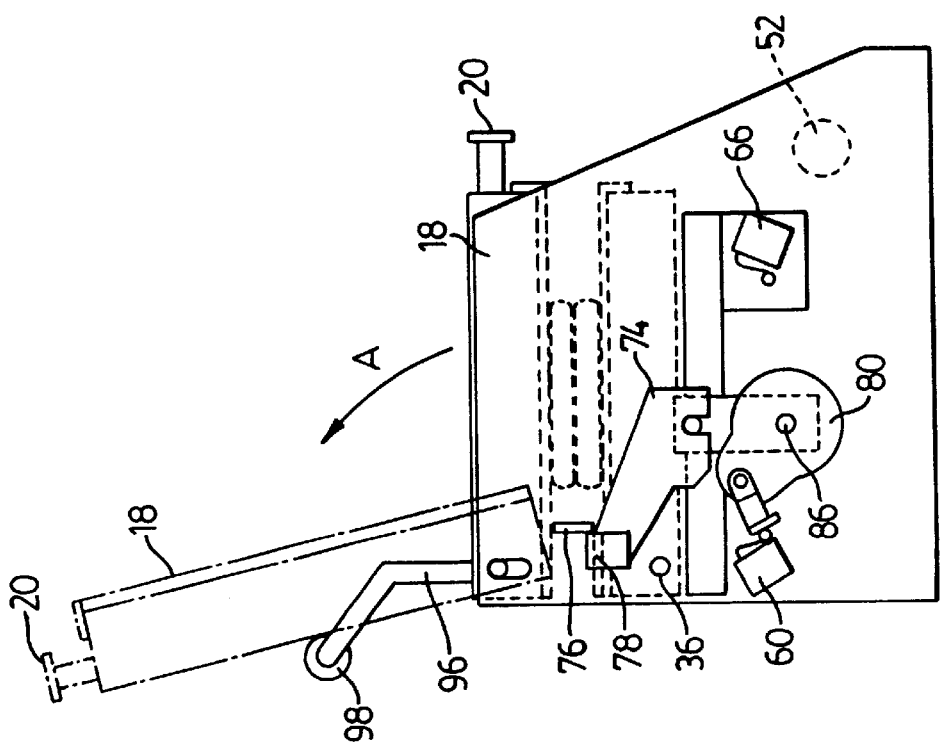

COOKING GRILL

FIELD OF THE INVENTION

This invention relates to cooking equipment, and more particularly, to cooking equipment that is capable of grilling of a food item. Most particularly, this invention relates to the type of cooking equipment that may simultaneously grill both sides of the food item to be cooked, such as a sandwich, chicken fillet or the like.

BACKGROUND OF THE INVENTION

Lately, especially in convenience stores, it has become fashionable to offer a self serve snack or sandwich bar with prepackaged prepared food portions such as sandwiches, hotdogs, hamburgers, and the like which then may be reheated by the customer in a microwave provided by the store. However, reheating such foods in a microwave tends to produce an overly hot meat portion, together with soggy bread. It is difficult for the customers to gage the heating process precisely enough to end up with food which is properly heated to customer requirements (since microwaves vary in power and the food portions vary in size).

Small cooking units are used in restaurants and the like for contact heating individual food servings such as sandwiches or the like. These devices are typically referred to as grills, and involve heated plates which can be applied to the food. An example of such a device is U.S. Pat. No. 3,776,124 to Morley entitled Automatic Sandwich Grill. This Automatic Sandwich Grill includes upper and lower heated platens which engage one or more sandwiches or bread slices with a regulated continuous pressure. Then, a timer which is activated during the cooking cycle, causes the platens to separate and for the lower platen to steeply tilt to about a 45° angle to discharge the toasted sandwich by gravity.

However, the device of this prior patent has several disadvantages. Chief among these disadvantages, is that the cooked food is suppose to slide off of the lower platen upon the cooking time having elapsed. To be most sure that the food is removed from the lower platen, the lower platen is tipped to a 45° angle. This angle fully exposes the heated platen to the user and in the context of home use or self service by a customer, this exposure of a hot element is unacceptably dangerous as being a safety hazard. In the context of a store, having no cooking utensils there may be a tendency to reach for the food off the hot surface. Further, because of the deterioration of the cooking surface over time, even the 45° angle taught by this prior patent will not guarantee the release of food from the cooking surface. Much will depend upon how clean the cooking surface is kept. In the event of normal build up on the platen, it is likely that food will stick. Sticking food will then be likely to be overcooked or burned, even if the power to the resistive heating elements is turned off, because of the thermal inertia of the metal cooking platen. Customers could burn their fingers, trying to remove the food.

Additionally, in this prior device a complicated spring and balance arrangement is required to provide an adequate seating pressure on the food being cooked.

Other patents disclosing various cooking devices include the following:

| | |
|---|---|
| O'Bryant Miller, Jr. | 3,520,249 |
| Kelterborn et al. | 4,976,194 |
| Ott et al. | 5,095,814 |
| Finesman, deceased, et al | 5,193,439 |
| Long | Re. 34,617 |

SUMMARY OF THE INVENTION

What is desired is a cooking device which will simultaneously cook top and bottom surfaces of an object to be cooked. Preferably, the cooking device will include upper and lower cooking plates extending between and being supported by supports. The cooking device should be easy to use, and should in its finished position provide for automatic release of the cooked food. In addition, the device should be mechanically simple to reduce manufacturing costs and improve the design. Further, in the process of releasing the cooked food, the user of the device should not be unnecessarily exposed to a hot surface. Most preferably provision should be made to ensure that the cooking device provides for ejection of the cooked food without the food becoming stuck and overcooking or burning. The device should be safe and easy to use.

Therefore, according a first aspect of the present invention there is disclosed a cooking device comprising:

a first support;

a second support;

a lower cooking plate extending between and being supported by said first and second supports;

an upper cooking plate extending between and supported by said first and second supports and being movable between a lowered cooking position and a raised position; and an ejector, located between said upper and said lower plates, said ejector being movable between a rearward and a forward position.

In a further embodiment of the invention, the cooking device will also include a motor, for pivoting the lower cooking plate between a cooking position and an ejection position, wherein in the ejection position, the lower cooking plate is substantially covered by the upper cooking plate to prevent unwanted exposure of the heating cooking plate to a user.

BRIEF DESCRIPTION OF THE DRAWINGS

FIG. 2c is a side view of the cooking device in a cooking position.

FIG. 3 is a side view of the control panel of the cooking device of FIG. 1.

DETAILED DESCRIPTION OF THE PREFERRED EMBODIMENTS

Figure 1:
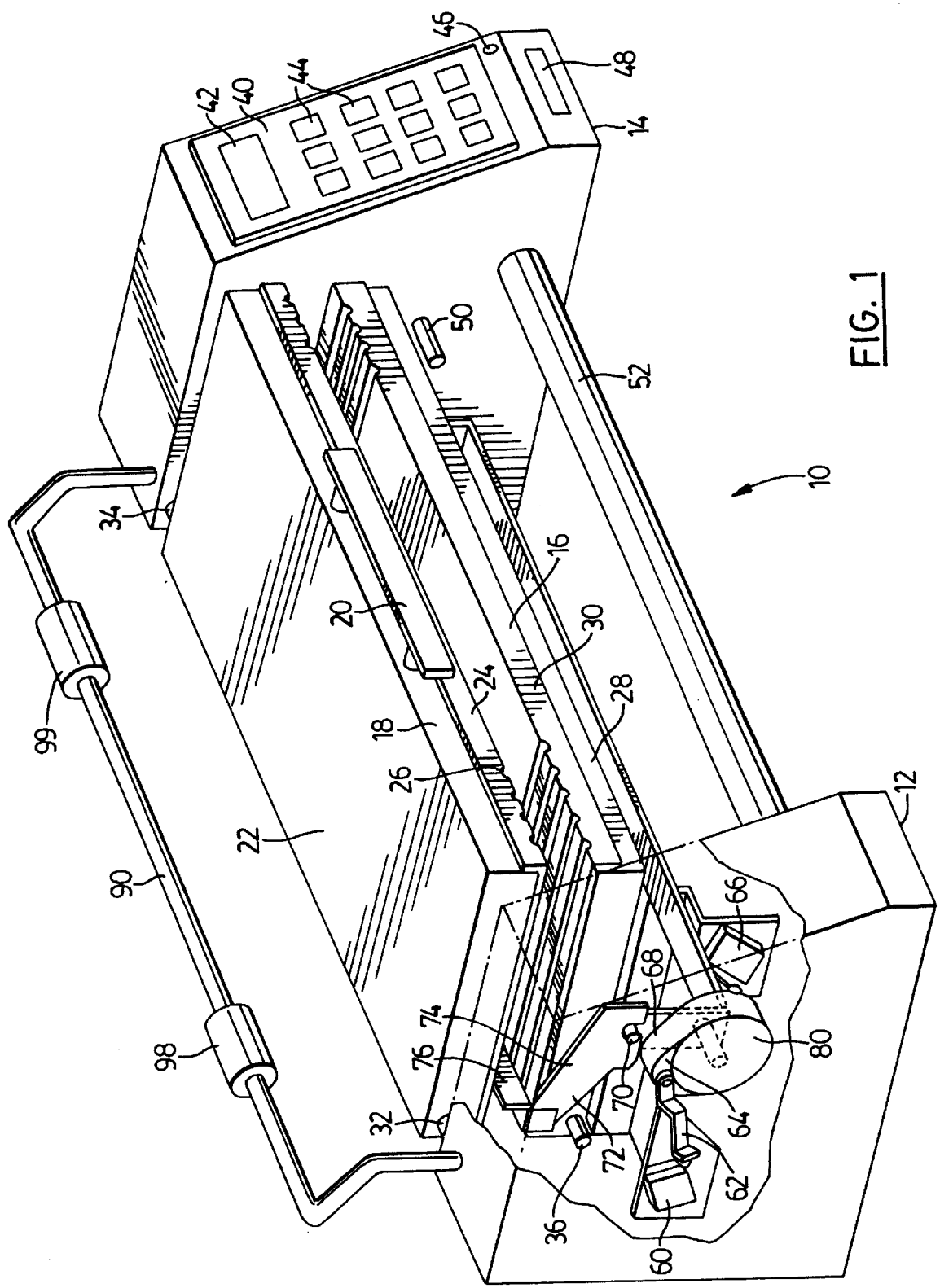
FIG. 1 is view of a cooking device according to the present invention, shown in part break away section.

FIG. 1 shows a cooking device according to the present invention which is indicated generally at 10. The cooking device 10 has a first or left hand support 12 and a second or right hand support 14. Extending between the first and second support 12, 14 are a lower cooking plate 16 and an upper cooking plate 18. The upper cooking plate 18 includes a handle 20. The upper cooking plate 18 is comprised of a cover portion 22 and a heating platen 24. The heating platen 24 is preferably formed from a heat conductive material such as aluminium, steel or the like and includes a plurality of transverse grooves 26. Most preferably the food contacting surface of the platen 24 is teflon or otherwise coated with a nonstick coating in the usual manner. Attached to the other side are resistance heating elements (not shown) such as ribbon strips or the like. Similarly, the lower cooking plate 16 includes a cover portion 28 and a heating platen 30. It will be appreciated by those skilled in the art that cover portions 22 and 28 cover the wiring which is connected to the heating elements or resistors (not shown) located behind each of the heating platens 24, 30.

The upper cooking plate 18 is supported between the first support 12 and the second support 14 and is connected thereto by means of two hinges 32 and 34. Similarly the lower cooking plate 16 is also hingedly connected between the supports, although in FIG. 1 only one hinge point 36 is visible in the break away portion of the Figure. The other hinge 37 is visible in FIG. 3.

Located on the front face of the second support 14 is a control console 40. The control console 40 includes LED display panel 42, a number of control buttons 44 and an indicator light 46. Also provided is an ON/OFF switch 48.

Also shown extending from second support 14, is a stop pin 50 which is explained in more detail below.

Extending between the first support 12 and the second support 14 is a structural member 52. The structural member 52, in combination with the hinges 32, 34, 36, and 37 at the rear of the upper cooking plate 18 and the lower cooking plate 16 tie the cooking device 10 together in a solid unit. Most preferably member 52 is hollow, to allow wires to pass between first support 12 and second support 14 without being exposed.

Turning to the first support 12, there is shown in FIG. 1 in break away section, some of the internal components of the present invention. In particular, there is shown a first micro switch 60, an actuator 62, a rotating eccentric cam 64, a second micro switch 66 and, a rotating link arm 68 having pivoting connection pin 70, connected to a ejector assembly 72. The ejector assembly 72 includes a side arm 74 as well as a scraper or pusher bar 76. Although not visible in FIG. 1, most preferably the pusher bar 76 includes nylon or teflon guides 78 to facilitate the smooth riding of the pusher bar 76 over the lower platen 30.

Also located in the first support 12, and shown in schematic outline is an actuator, which in the preferred form is an electric motor 80. The motor 80 is operatively connected to the rotating cam 64 as well as the ejector assembly 72.

Figure 2A:
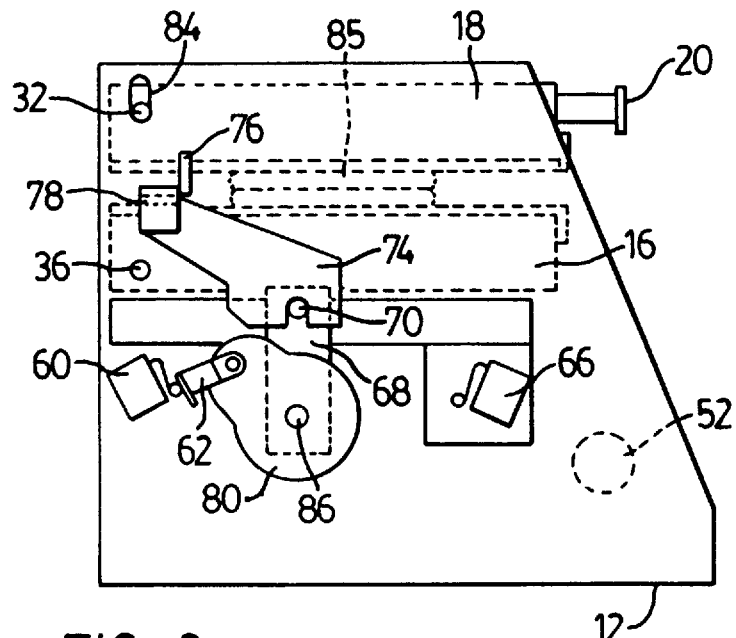
FIG. 2a is a side view of the cooking device in a first position.

Turning now to FIG. 2a, the operation of the present invention can now be understood. FIG. 2a is a section along lines 2—2 of FIG. 1 exposing the internal components housed in the first support. It can now be appreciated that the width of the first support 12 allows the various components to be covered. Other widths and configurations could be also used, but the one illustrated provides reasonable results.

The configuration of the upper and lower cooking plates is the same in FIG. 2a as in FIG. 1. Visible in FIG. 2a is the handle 20 and the upper hinge 32. It is to be noted that the upper hinge 32 travels in a vertical slot 84. In this manner, the upper platen can accommodate food (shown as 85 in FIG. 2a) of varying thickness, and can apply a cooking pressure equal to the weight of the upper platen on the food.

In this sense the upper plate "floats" on the food to be cooked, providing a uniform and consistent pressure to ensure thorough heating of the food item. This is a mechanically simple design which produces reasonable results. Additionally, the vertical slot 84 (it being understood that a similar slot exists in the second support) allows the upper plate to tilt slightly to increase the contact area for direct heating of uneven food pieces, such as meats, fish or the like. The length of the vertical slot 84 will determine the range of food thickness that can be accommodated between the heating platens.

Also shown in FIG. 2a is the drive axel 86, which is operatively connected to the motor 80. Both the eccentric cam 64 and the link arm 68 are operatively connected to the drive axel 86. Thus, as the motor 80 turns drive axel 86, the other elements operatively connected thereto are also turned.

The operation of the unit 10 can now be understood. Beginning in FIG. 2a, the cooking cycle is started. In some cases, it may be necessary to preset the cooking temperature. Once the temperature is reached, a signal is given to advise the user, such as an indicator light 46. The user then sets the desired time on the LED to start the cooking cycle. A timer, shown on LED display 42 counts down the predetermined cooking time. At the end of the predetermined cooking time the motor 80 is initiated. As the motor 80 is initiated, it begins to turn drive axel 86 in a clockwise direction as shown in FIG. 2. As the drive axel 86 rotates, the eccentric cam 64 and link arm 68 rotate towards the right as shown in FIG. 2b.

It should be noted that there is identical link arm 68 connection at the right hand side of the lower platen as there is on the left hand side and being described herein. An extension of pin 70 between the two link arms 68 (one on either side of the device 10) acts as a support rod. The lower platen is therefore supported along two axes. The first axis is through the lower hinges 36, and the second is along the support rod 88 extending between the link arms 68. As the motor 80 rotates the drive axel 86 in a clockwise direction, the link arm 68 is also rotated forward. This simultaneously allows the lower plate 16 to rotate downward at a front edge on the support rod, and, drags the pusher bar 76 forward across the cooking surface of the lower plate 16. This rotation continues, until the second micro switch 66 is closed for example by support arm 74 thereby triggering the motor 80 to reverse. The motor 80 then reverses, and assumes a position as shown in 2c. The motor, upon the actuator 62 engaging first micro switch 60 is shut off and a new cooking cycle is ready to be commenced.

It will be appreciated that a user may grab handle 20 and lift upper cooking plate 18 up, in direction of arrow A, but this is not done automatically. A person must actually lift it up, to place on the lower cooking plate 16, a food item for grilling.

Figure 2B:
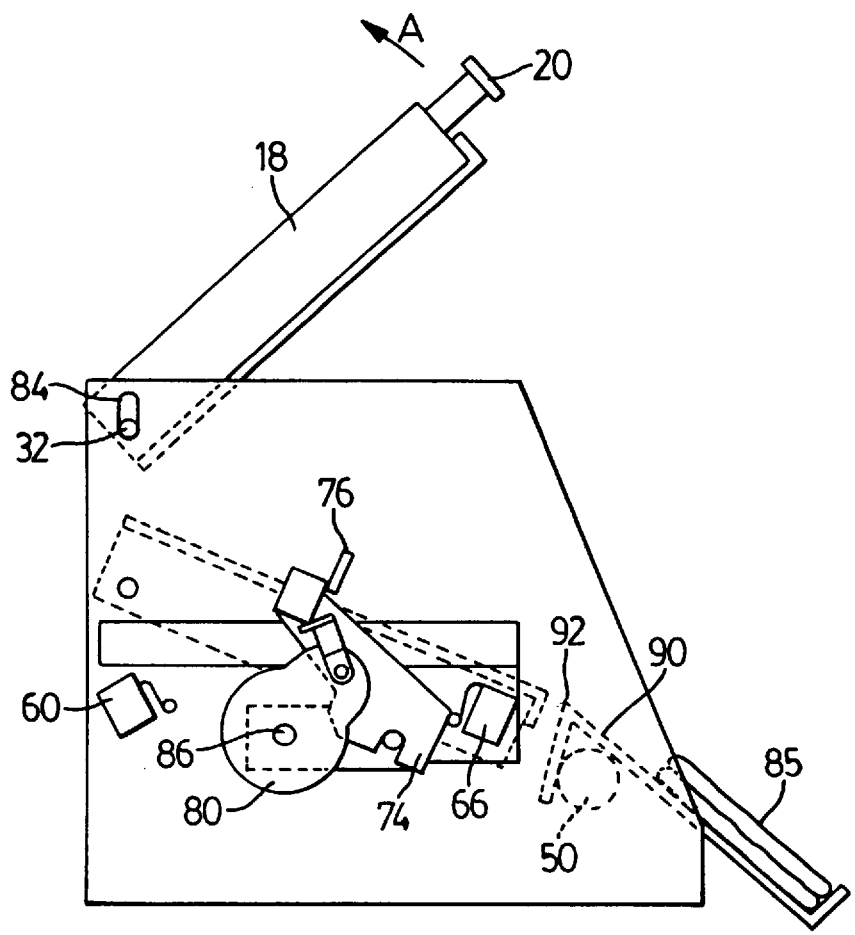
FIG. 2b is a side view of the cooking device in a second position.

An additional feature of the present invention which is shown in FIG. 2b is a support tray 90. Most preferably the support tray 90 is made from an easy to clean material, such as stainless steel, and, is inclined at an angle to facilitate easy sliding of the cooked food from the heated surface of the plate. Most preferably, the upper edge 92 of the support tray 90 is positioned adjacent to the lower edge location of the front of the lower plate 16 when the cooking cycle is finished. The support tray 90 may be conveniently hooked over the support member 50 as shown. This makes tray 90 easily removed for cleaning.

In this manner, the food is smoothly and positively ejected by the pusher bar 76 from the lower platen onto the support tray 90. It can now be appreciated that the transverse grooves formed in the platen facilitate the pushing of the food forwardly off of the platen by lying along the path of travel of the pusher bar 76. Other surface configurations can also be used such as a flat surface, but the transverse grooves are preferred because of the desirable grill marks made on the food. Further, when the food is resting on the tray 90, it may be readily picked up from the tray 90, which will be at room temperature. It can now be appreciated that the support 50 is positioned to ensure that the transition between the lower plate 16 and the support tray 90 is as smooth as possible.

When not in use, the upper plate 18 may be fully raised, past the 90° point, to about 100° to about 130°, most preferably about 110° to 115°. In this position it is resting against a support bracket 96, with stops 98, 99. The stops are preferably made from nylon, teflon or the like, and support the top plate in a raised position as shown in FIG. 2c. The stops also act as wall bumpers to prevent the device from being positioned too close to a back wall.

Turning to FIG. 3, there is shown the control panel 40 for the cooking device 10. The control panel 40 includes a number of function buttons 44, by which the cooking time can be preset by the user. In addition to the on/off switch 48 shown, an indicator light 46 can be used to show that preheating, prior to beginning cooking is complete, and that actual cooking can be commenced. Also, there is most preferably including a further indicator, for identifying that cooking is completed, such as a buzzer or other signals.

It can be appreciated that the present invention provides a lower heating plate, which pivots from a rearward hinge axis under a non-moving top heating plate, and thus, rather than becoming exposed, as in the prior art, remains safely below and out of the way. By providing the pusher bar 76, the present invention ensures that only a modest tile angle is required resulting in less exposure, and that food will be pushed off, even if there is a tendency for it to stick. Thus, the chance of burning food is reduced. Good results have been achieved when the lower plate tips down between 15° and 30°, with the most preferable angle being about 20°. Because the support tray 90 relies on gravity, it is preferred to incline the support tray 90 more steeply, at about 45°.

Figure 4:
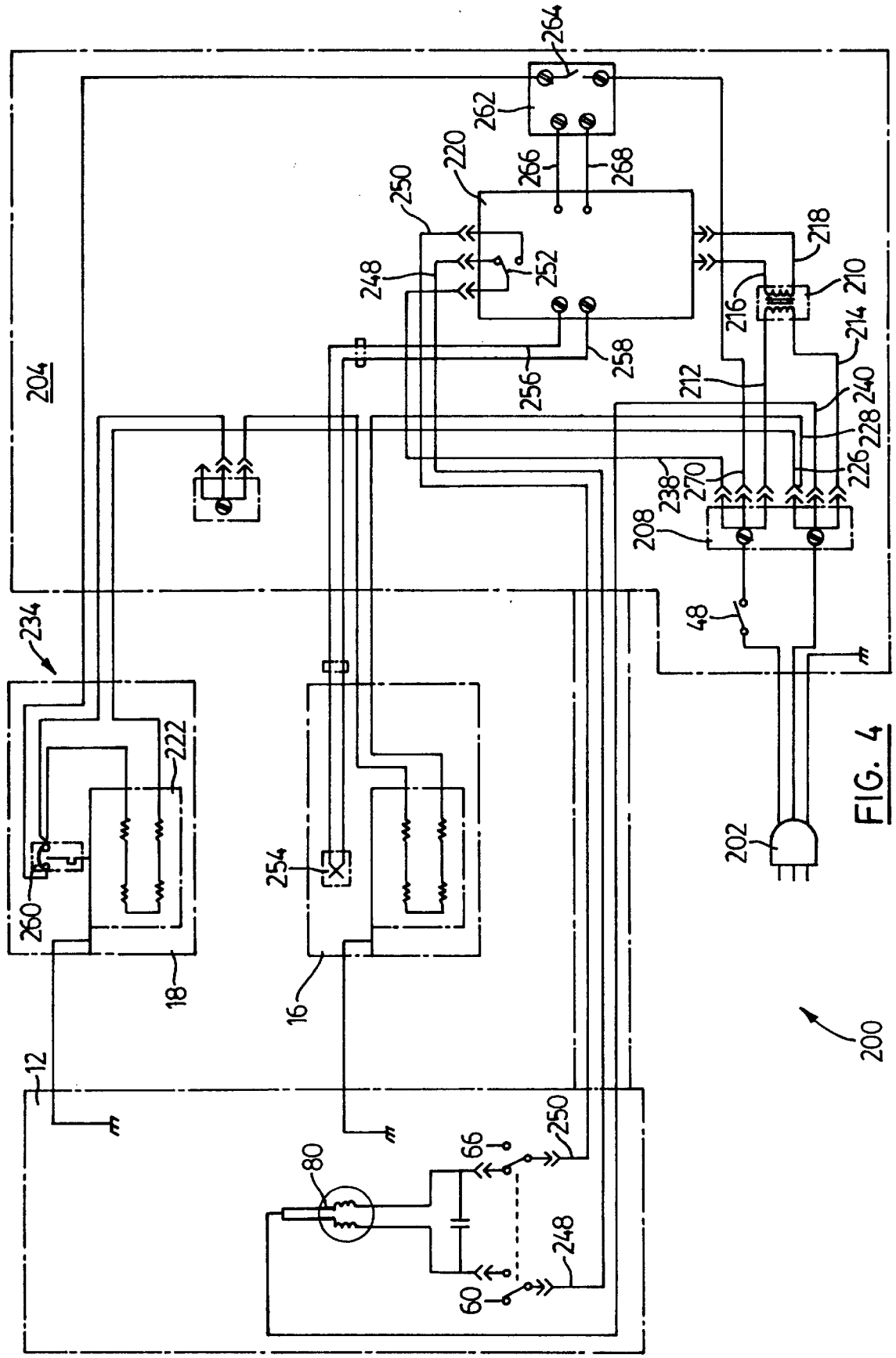
FIG. 4 is a schematic circuit diagram of the cooking device according to the present invention.

FIG. 4 shows a control circuit 200 for the cooking device 10. A plug 202 connects input AC power with the electrical components housed in a right side 204 of the cooking device 10. Although the following description relates to 120 volt power, it could also be configured for 240 volt power. The input AC power connects from the plug 202 through on/off switch 48 to a current splitter 208. The current splitter 208 divides the input AC power into three parts.

One part of the input AC power is directed to transformer 210 through output lines 212 and 214. Transformer 210 steps the input voltage down from 120 volts to 24 volts AC, which is distributed on output lines 216 and 218 as input power to control module 220.

A second part of the input AC power is used to provide power to heat the upper heating element 222 and lower heating element 224, through output lines 226 and 228. The upper heating element 222 is located in upper cooking plate 18, and the lower heating element 224 is located in lower cooking plate 16. The cooking plates 16 and 18 are located in a mid section 234 of the cooking device 10.

A warm-up sensor 254 in the lower cooking plate 16 detects the temperature in the cooking device 10. The temperature information is fed to the control module 220 through output lines 256 and 258. An over-temperature cutoff switch 260 is located in the upper cooking plate 18, and is connected to a heat sink 262 located in the right side 204. The heat sink 262 contains an internal switch 264 and is controlled by output lines 266 and 268 from the control module 220. The electric circuit through the heat sink 262 is completed through output line 270.

A third part of the input AC power is directed to power the electric motor 80 through output lines 238 and 240. The electric motor 80 is housed in first support 12 of the cooking device 10. Also located in the first support 12 is a first micro switch 60 and a second micro switch 66. The micro switches 60 and 66 connect with the control module 220 through output lines 248 and 250. An internal switch 252 in the control module directs current between output lines 248 and 250.

In operation, when on/off switch 48 is closed power is provided to the heating elements 222 and 224 and the control module 220 is powered. When the temperature inside the cooking device 10 reaches a predetermined limit, light 46 turns on. This signals the user to insert the food item and start the timer. While the food item is cooking the control module maintains a count of time elapsed, and monitors the temperature of warm-up sensor 254 through output lines 256 and 258. If the temperature exceeds a predetermined limit, the control module 220 activates the internal switch 264 of heat sink 262 and the over-temperature cutoff switch 260 so that current is directed away from the heating elements 222 and 224. This lowers the temperature inside the cooking device 10 to an acceptable level.

When the count of time elapsed reaches a predetermined limit the control module 220 activates internal switch 252 to connect with output line 250. This completes the circuit connecting the electric motor 80, and causes the electric motor 80 to rotate. This rotation causes the lower cooking plate 16 to move downward and deposit the cooked food item on the support tray 90, as previously described. The electric motor 80 rotates until the second micro switch 66 is engaged, opening the electric circuit. This cuts off current to the electric motor 80, and causes it to stop rotating. At the same time, connection is made through the first micro switch 60. When the control module 220 detects the drop in current, it activates internal switch 252 to connect with output line 248. This restores current to the electric motor 80 through first micro switch 60, so that the electric motor 80 rotates again, but in an opposite direction. This causes the lower cooking plate 16 to move back up, until the first micro switch 60 is engaged, opening the electric circuit. At that time, current through the electric motor 80 stops, rotation of the electric motor 80 stops, and the lower cooking plate 16 is restored to its original position.

It will be appreciated by those skilled in the art that various modifications can be made to the present invention without departing from the broad scope of the appended claims. Some modifications have been discussed above and other will be apparent to those skilled in the art. For example, while contact limit switches are disclosed, other types of limit sensors can be substituted with equal effect.

I claim:

1. A cooking device comprising:
   a first support;
   a second support;
   a lower cooking plate extending between and being supported by said first and second supports;
   an upper cooking plate extending between and supported by said first and second supports and being movable between a lowered cooking position and a raised position; and an ejector, located between said upper and said lower cooking plates, said ejector being movable between a rearward and a forward position.

2. A cooking device as claimed in claim 1 further comprising an actuator connected to said ejector to move said ejector between a rearward and a forward position.

3. A cooking device as claimed in claim 2 wherein said lower plate pivots between a cooking position and an ejection position.

4. A cooking device as claimed in claim 3 wherein said lower plate has a front edge, and, in said ejection position, said front edge is below and behind where said front edge is located during cooking to facilitate safe forward ejection of food from said lower cooking plate.

5. A cooking device as claimed in claim 4 wherein said lower cooking plate is supported by a pivotable rear support, and a movable front support.

6. A cooking device as claimed in claim 5 wherein said movable front support is linked to said ejector, and as said front support is lowered, said ejector is moved across the lower cooking plate, to eject a cooked food.

7. A cooking device as claimed in claim 2 wherein said actuator is an electric motor, and includes at least one control switch.

8. A cooking device as claimed in claim 7 including first and second control switches, wherein said second control switch is actuated when said lower cooking plate is tipped to a tilted ejection position, and tripping said second control switch causes said actuator to return said lower cooking plate to a generally horizontal cooking position, and wherein said second control switch is actuated when said lower cooking plate reaches said horizontal cooking position, whereupon said actuator is turned off.

9. A cooking device as claimed in claim 1 wherein said ejector is in the form of a push bar, and includes at least one glide.

10. A cooking device as claimed in claim 1 further including a support bracket for supporting said upper cooking plate in a raised position.

11. A cooking device as claimed in claim 10 wherein said support bracket includes at least one stop for cushioning said top cooking plate.

12. A cooking device as claimed in claim 1 wherein said upper and lower cooking plates include a plurality of grilling grooves, said grilling grooves being oriented along a line of travel of said ejector.

13. A cooking device as claimed in claim 1 further including a hollow support member extending between said first and second supports.

14. A cooking device as claimed in claim 13 wherein wiring is located in said hollow support member.

15. A cooking device as claimed in claim 1 further including a support tray for receiving food ejected from said lower cooking plate.

16. A cooking device as claimed in claim 15 wherein said support tray is angled more steeply than said lower cooking tray when said tray is in a lowered ejection position.

17. A cooking device as claimed in claim 15 wherein said support tray is angled at 45° relative to horizontal, or more, and said lower cooking plate is angled at about 20° relative to horizontal, in said ejection position.

18. A cooking device as claimed in claim 15 wherein said support tray is removably mounted onto said support member, and is sized and shaped to smoothly receive ejected food.

19. A cooking device as claimed in claim 1 further including a control panel, said control panel providing temperature control and timing to control cooking of food on said grill.

20. A cooking device as claimed in claim 19, further including an on-off switch.

21. A cooking device as claimed in claim 19, said control panel including an indicator light for signalling that preheating is complete.

* * * * *